UNITED STATES PATENT OFFICE.

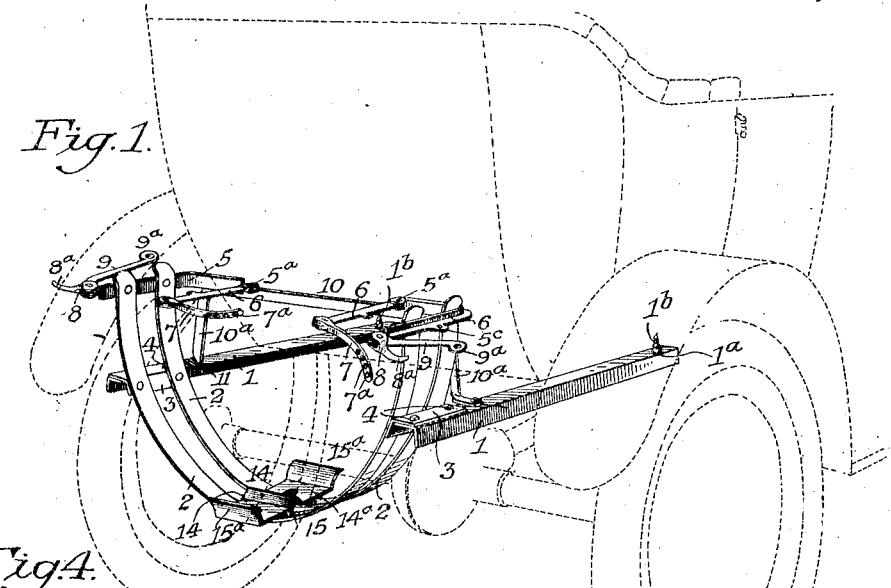
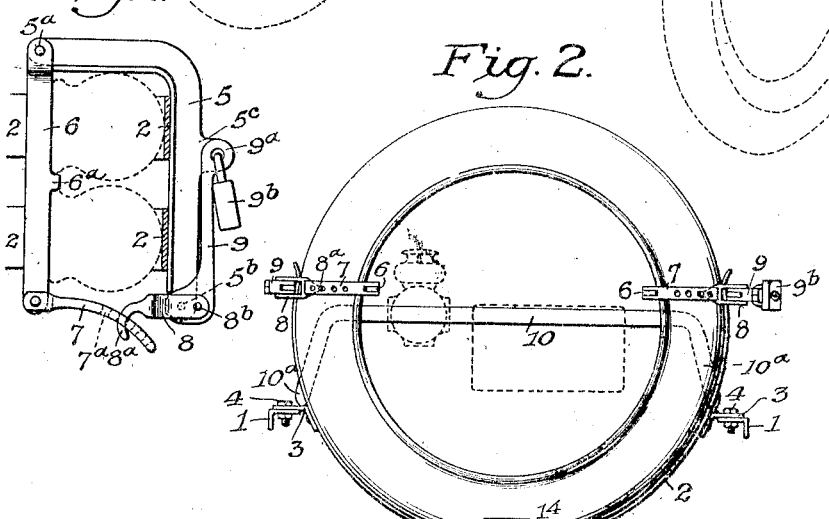
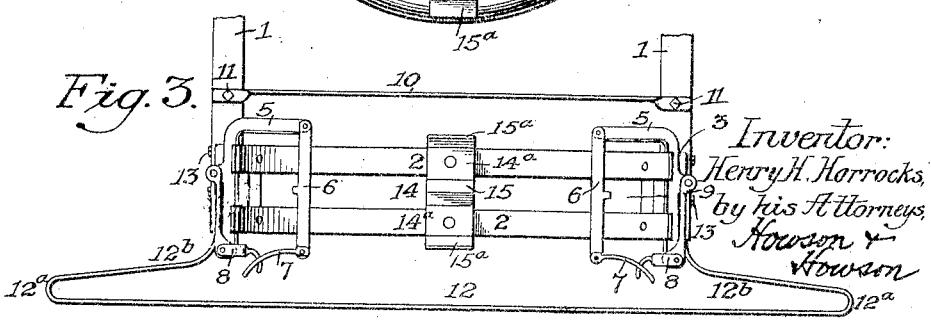

HENRY H. HORROCKS, OF PHILADELPHIA, PENNSYLVANIA, ASSIGNOR TO WILLIAM HORROCKS AND HENRY H. HORROCKS, TRADING AS WILLIAM HORROCKS & SON, OF PHILADELPHIA, PENNSYLVANIA.

TIRE-CARRIER.

1,338,630.    Specification of Letters Patent.    Patented Apr. 27, 1920.

Application filed March 21, 1919. Serial No. 284,108.

*To all whom it may concern:*

Be it known that I, HENRY H. HORROCKS, a citizen of the United States, residing in Philadelphia, Pennsylvania, have invented certain Improvements in Tire-Carriers, of which the following is a specification.

My invention relates to tire carriers, and one object of my invention is to provide a simple and efficient structure adapted to be disposed at the rear of an automobile; such carrier being supported by brackets or extensions suitably secured at the rear part of the automobile, and whose inner ends preferably underlie the body of the automobile.

A further object of my invention is to provide a tire carrier structure with a guard or bar to prevent the tires coming in contact with or marring the back of the automobile; such bar bracing and staying the supporting brackets and serving also to carry the license tag and a rear signal lamp.

A further object of my invention is to provide a buffer carried by the rear portion of the tire carrier structure, and a still further object is to provide efficient locking means to prevent theft of a tire or tires from the carrier structure.

These and other features of my invention are more fully described hereinafter, reference being had to the accompanying drawings, in which:

Figure 1, is a perspective view of the rear of an automobile (shown in dotted lines) illustrating my improved tire carrier structure mounted in position with respect thereto.

Fig. 2, is a rear elevation of the tire carrier structure showing a tire mounted therein.

Fig. 3, is a plan view of the tire carrier structure, and

Fig. 4, is a detached view illustrating my improved locking means for securing tires to the carrier against theft.

Extending rearwardly from the automobile and attached to the sides of the same or at some other suitable portion, I provide extension brackets or supports 1. These brackets are preferably of L-shape angle iron, though they may be made of other suitable material, and they may be of any convenient or desired shape in cross section.

An important feature of the structure forming the subject of my invention resides in the manner of securing the supporting brackets 1 to the body of the automobile. My improved structure is particularly applicable to Ford cars, (although not necessarily limited thereto), and the features herein mentioned are those common to Ford automobiles. The rear member of the Ford chassis is arched, and the ends of the same underlie the rear of the car body; the latter being suitably bolted or otherwise secured to said arched member of the chassis.

In practice, in applying the supporting members 1 to a Ford automobile, slight separation is made between the floor of the car body and this arched end member, and the angle pieces 1 may then be slipped in over the ends of said arched member and between the same and the bottom of the car. At the inner ends of the members 1, holes $1^a$ are drilled for the reception of lag screws $1^b$ whereby said ends may be permanently attached to the bottom of the car to prevent fore and aft movement, since the other attachments (hereinafter referred to) at the rear ends of said supports 1, from which the tire carrier proper is hung, prevent all danger of the same spreading.

Disposed between these bracket supports 1 is a substantially semi-circular strip of metal 2, which may carry supporting pieces or hangers 3, or other means, whereby such strip 2 may be hung on the bracket extensions 1; the supporting pieces 3 being preferably secured thereto by bolts, rivets, or the like indicated at 4. There may be a plurality of these strips 2, and in the drawings I have shown two, whereby two tires may be accommodated in the carrier structure.

In order to securely lock the tires in place after they are disposed in the carrier, I preferably provide positive retaining means therefor, which may comprise a pair of members 5 and 6; carrying coöperating fastening members 7 and 8, hereinafter described, and the member 8 being attached to an eccentric lever 9 by means of which the fastening means are operated. The member 5, which may be of angle iron as shown, is riveted or otherwise secured to the strip (or strips) 2, and this member, which may be L-shaped, is provided at its ends for pivotal engagement; at $5^a$ with the member 6, and at $5^b$ with the eccentric lever 9. Pivotally attached to the opposite end of the member 6 is the member 7, which is apertured at 7ª and adapted to receive the hooked end 8ª of the shackle member 8 which is pivotally connected at 8ᵇ to the eccentric lever 9. Fig. 4, shows the securing means in the locked position. After the tire (or tires) is in place, the member 6 is swung around on its pivotal connection with the member 5 against the inner side or rim of the tire (or tires), and this member is preferably provided with a spacing projection or lug 6ª, and the eccentric lever being free, the hooked end 8ª of the member 8 is connected in one of the apertures of the arm 7, in proper position to permit the eccentric lever to be moved into position and cause the parts to firmly grip the tire (or tires). This eccentric lever is provided with an apertured end 9ª adapted to register with an apertured projection 5ᶜ at the side of the member 5, and when the parts are in locked position as indicated in the drawing, the lever 9 may be secured to the member 5 by a padlock 9ᵇ. Locking means of this character are carried at each side of the support.

Supported by the bracket extensions 1, I may provide a bar 10 having legs 10ª secured to said bracket extensions by rivets, bolts, or other fastening means 11. This bar lies behind the tires when they are mounted in the carrier and it may serve to prevent them coming in contact with or marring the rear of the car body when jolting over bad roads and the like. In addition this bar 10 serves as a spacing and bracing member for the brackets 1, and may also serve as a support for a license tag, and a rear signal lamp; (both being shown by dotted lines).

At the rear of the tire carrier structure I may provide a buffer member 12, which may have curved ends 12ª, and return curved arms 12ᵇ; the free ends of such buffer underlying the ends of the bracket extensions 1, to which they may be secured by rivets, bolts, or other fastening means, as indicated at 13.

The lower portions of the strips 2 of the support, when two are employed, are preferably tied together by a cross member 14, upon which the tires may rest; said member having a raised portion 15 at the center, and flanged ends 15ª, which form pockets or spaces 14ª for the reception of the tire or tires.

From an examination of my improved construction, it will be noted that the rear ends of the brackets 1 being connected by a cross-bar 10, as well as by the curved strips 2, insures maintenance of the brackets in the proper supporting position for the tire supporting structure, while the screws 1ᵇ at the inner ends of said brackets 1 will secure the same against fore and aft movement. The further fact that said brackets 1 lie over the ends of the rear arched member of the chassis, and between the latter and the bottom of the car, insures absolutely that no vertical movement of the supporting structure can occur.

It will be understood, of course, that changes may be made in the various details of construction without departing from my invention, and that while definite embodiments of the several details of the same have been shown in the accompanying drawings and described with more or less particularity, I do not wish to be limited to the exact constructions disclosed, and my claims are to be read as covering equivalent constructions capable of performing the functions for which my improvements have been designed.

I claim:

1. The combination in a tire carrier, of a tire supporting structure; and at least one tire retaining device mounted on said structure, said device consisting of an L-shaped member; a bar having one of its ends pivoted to one of the arms of said member; an arm pivoted to the other end of said bar and having an opening; a lever fulcrumed to the free end of the other arm of the L-shaped member; a member pivoted to the lever having a hook to enter said opening of the arm; and means for locking the lever to the L-shaped member in position to prevent the removal of the hook from the opening of said arm.

2. The combination in a tire carrier of a tire supporting structure; and at least one tire retaining device mounted on said structure, said device consisting of an L-shaped member; a bar having one of its ends pivoted to one of the arms of said member; an arm pivoted to the other end of the bar and having a series of openings; a lever fulcrumed to the free end of the other arm of the L-shaped member, said lever having a pivoted arm with a hook the end of which is adapted to enter any of the openings of said series, the free end of said lever and an intermediate portion of one of the arms of the L-shaped member having openings adapted to register to receive a fastening.

3. In a tire carrier, the combination with a vehicle, of rear extension brackets carried thereby, curved strips carried by said brackets, and forming a tire receptacle, supporting members carried by the strips at points below the top thereof and adapted to be secured to and hang from said brackets, hinged retaining means at each side of the carrier adapted to be locked over a tire or tires carried by the receptacle formed by said strips, each of said retaining means including an L-shaped bar secured to and crossing one side of the upper portion of the curved strips and secured to and spacing the strips at the upper end, a member pivoted at one end to one arm of said bar and extending parallel with and spaced from an arm of the bar and adapted to confine the tire or tires between itself and said arm, coöperating hook and eye members pivotally mounted on similar ends of the bar and member, and an eccentric lever to which one of said latter members is pivotally connected, said eccentric lever being pivotally connected to the end of one of the arms of the fixed bar and closable thereagainst, said lever and bar having registering openings and said lever serving to clamp the retaining member around a tire or tires.

HENRY H. HORROCKS.